US012153179B2

(12) United States Patent
He et al.

(10) Patent No.: US 12,153,179 B2
(45) Date of Patent: Nov. 26, 2024

(54) METHOD AND SYSTEM FOR DETERMINING ATTENUATED SEISMIC TIME

(71) Applicant: SAUDI ARABIAN OIL COMPANY, Dhahran (SA)

(72) Inventors: Yi He, Beijing (CN); Song Han, Beijing (CN); Yi Luo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 216 days.

(21) Appl. No.: 18/048,769

(22) Filed: Oct. 21, 2022

(65) Prior Publication Data
US 2024/0184007 A1    Jun. 6, 2024

(51) Int. Cl.
*G01V 1/36*    (2006.01)
*G01V 1/28*    (2006.01)
(Continued)

(52) U.S. Cl.
CPC .............. *G01V 1/362* (2013.01); *G01V 1/282* (2013.01); *G01V 1/306* (2013.01); *G01V 1/345* (2013.01); *G01V 2210/584* (2013.01)

(58) Field of Classification Search
CPC ........ G01V 1/362; G01V 1/282; G01V 1/306; G01V 1/345; G01V 2210/584; G01V 2210/6222; G01V 1/303
See application file for complete search history.

(56) References Cited

U.S. PATENT DOCUMENTS 8,756,042 B2    6/2014    Tan et al.
10,185,046 B2    1/2019    Anderson et al.
(Continued)

FOREIGN PATENT DOCUMENTS

CN    112782764 A    5/2021
CN    112925012 A    6/2021
(Continued)

OTHER PUBLICATIONS

International Search Report and Written Opinion Issued in Related International Application No. PCT/CN2023/101619, Mailed Aug. 16, 2023, 8 pages.
(Continued)

*Primary Examiner* — Daniel Pihulic
(74) *Attorney, Agent, or Firm* — Osha Bergman Watanabe & Burton LLP (57) ABSTRACT

A method may include obtaining seismic data based on a seismic survey regarding a geological region of interest. The method may further include obtaining grid data based on the geological region of interest. The method may further includes determining various travel times using the seismic data, the grid data, an Eikonal function, and a velocity model for the geological region of interest. The method may further include determining various attenuated travel times using the travel times, the grid data, and a forward modeling function that includes various gradient components. The method may further include determining various updated attenuated travel times using the attenuated travel times, the grid data, the forward modeling function, and a fast sweeping method. The method may further include generating an attenuation model of the geological region of interest using the updated attenuated travel times.

20 Claims, 7 Drawing Sheets

(51) Int. Cl.
*G01V 1/30* (2006.01)
*G01V 1/34* (2006.01)

(56) References Cited

U.S. PATENT DOCUMENTS

| | | | |
|---|---|---|---|
| 10,317,548 | B2 | 6/2019 | Hu et al. |
| 2010/0054082 | A1 | 3/2010 | McGarry et al. |
| 2014/0336940 | A1 | 11/2014 | Bettinelli et al. |
| 2022/0066064 | A1 | 3/2022 | Al-Garni et al. |
| 2022/0283329 | A1 | 9/2022 | Zwartjes et al. |
| 2022/0396289 | A1 | 12/2022 | Li et al. |
| 2022/0414429 | A1 | 12/2022 | Torrado et al. |
| 2024/0142649 | A1* | 5/2024 | Liu .................. G01V 1/305 |
| 2024/0184007 | A1* | 6/2024 | He .................. G01V 1/282 |

FOREIGN PATENT DOCUMENTS

| | | |
|---|---|---|
| CN | 114780909 A | 7/2022 |
| CN | 116203626 A | 6/2023 |
| WO | 2019099974 A1 | 5/2019 |
| WO | 20200231289 A1 | 11/2020 |
| WO | 2022/153984 A1 | 7/2022 |

OTHER PUBLICATIONS

Quan, Youli et al., "Seismic attenuation tomography using the frequency shift method"; Geophysics; vol. 62, Issue 3; pp. 895-905; May-Jun. 1997 (11 pages).

Cavalca, Maud et al., "Ray-based tomography for Q estimation and Q compensation in complex media"; SEG Technical Program Expanded Abstracts 2011; pp. 3989-3993; 2011 (5 pages).

Taillandier, Cédric et al., "First-arrival traveltime tomography based on the adjoint-state method"; Geophysics; vol. 74; Issue 6; pp. WCB57-WCB66; Nov.-Dec. 2009 (10 pages).

Huang, Jun-Wei et al., "Joint transmission and reflection traveltime tomography using the fast sweeping method and the adjoint-state technique"; Geophysical Journal International; vol. 188, Issue 2; pp. 570-582; Feb. 2012 (13 pages).

Huang, Xinwei et al., "First arrival Q tomography based on an adjoint-state method"; Journal of Geophysics and Engineering; vol. 17, Issue 4; pp. 577-591; Aug. 2020 (15 pages).

Hao, Qi et al., "An acoustic eikonal equation for attenuating transversely isotropic media with a vertical symmetry axis"; Geophysics; vol. 82, Issue 1; pp. C9-C20; Jan.-Feb. 2017 (12 pages).

Qian, Jianliang et al., "Fast Sweeping Methods for Eikonal Equations on Triangular Meshes"; Siam Journal on Numerical Analysis; vol. 45, Issue 1; pp. 83-107; 2007 (25 pages).

Cheng, Peng, "Anelastic attenuation in seismic data: modeling, measurement, and correction"; A thesis submitted to the Faculty of Graduate Studies in partial fulfilment of the requirements for the degree of Doctor of Philosophy; University of Calgary, Department of Geoscience; pp. ii-207; Aug. 2013 (234 pages).

Gómez, J. V. et al., "Fast Methods for Eikonal Equations: An Experimental Survery"; IEEE Access; vol. 7; pp. 39005-39029; 2019 (25 pages).

He, Y., "Parallel fast sweeping method for computing seismic attenuated time"; 83rd EAGE Annual Conference & Exhibition; vol. 2022; pp. 1-5; Jun. 2022 (5 pages).

Waheed, U.B. et al., "A holistic approach to computing first-arrival traveltimes using physics-informed neural hetworks"; 83rd EAGE Annual Conference & Exhibition; vol. 2022; pp. 1-5; Jun. 2022 (5 pages).

Waheed, Umair bin et al., "Eikonal solution using Physics-informed neural networks"; EAGE 2020 Annual Conference & Exhibition Online; vol. 2020; pp. 1-5; Dec. 2020 (5 pages).

Smith, Jonathan D. et al., "EikoNet: Solving the Eikonal Equation With Deep Neural Networks"; IEEE Transactions on Geoscience and Remote Sensing; vol. 59, Issue 12; pp. 10685-10696; Dec. 2021 (20 pages).

Chen, Yunpeng et al., "Eikonal Tomography With Physics-Informed Neural Networks: Rayleigh Wave Phase Velocity In the Northeastern Margin of the Tibetan Plateau"; Geophysical Research Letters; vol. 49, Issue 21, Research Letter e2022GL099053; pp. 1-9; Nov. 16, 2022 (9 pages).

* cited by examiner

METHOD AND SYSTEM FOR DETERMINING ATTENUATED SEISMIC TIME

BACKGROUND

Various seismic processing operations are performed on seismic data from a survey to convert time-based seismic data into a depth representation of a subsurface. For example, seismic processing operations may include surface multiple filtering and other seismic data correction operations. Likewise, seismic processing may also include application of seismic inversion techniques and migration algorithms to velocity models.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining seismic data based on a seismic survey regarding a geological region of interest. The method further includes obtaining grid data based on the geological region of interest. The grid data include various grid nodes disposed between a respective seismic source among various seismic sources and a respective seismic receiver among various seismic receivers. The seismic data correspond to a seismic survey based on the seismic sources and the seismic receivers. The method further includes determining, by a computer processor, various travel times using the seismic data, the grid data, an Eikonal function, and a velocity model for the geological region of interest. The method further includes determining, by the computer processor, various attenuated travel times using the travel times, the grid data, and a forward modeling function that includes various gradient components. The method further includes determining, by the computer processor, various updated attenuated travel times using the attenuated travel times, the grid data, the forward modeling function, and a fast sweeping method. The fast sweeping method includes various alternating sweeps of the grid data using the forward modeling function. The method further includes generating, by the computer processor, an attenuation model of the geological region of interest using the updated attenuated travel times.

In general, in one aspect, embodiments relate to a system that includes a network that includes various parallel processors, and a seismic interpreter that includes a computer processor. The seismic interpreter is coupled to the network. The seismic interpreter obtains seismic data based on a seismic survey regarding a geological region of interest. The seismic interpreter obtains grid data based on the geological region of interest. The grid data include various grid nodes disposed between a respective seismic source among various seismic sources and a respective seismic receiver among various seismic receivers. The seismic data correspond to a seismic survey based on the seismic sources and the seismic receivers. The seismic interpreter determines various travel times using the seismic data, the grid data, an Eikonal function, and a velocity model for the geological region of interest. The seismic interpreter determines various attenuated travel times using the travel times, the grid data, and a forward modeling function that includes various gradient components. The seismic interpreter determines, using the parallel processors, various updated attenuated travel times using the attenuated travel times, the grid data, the forward modeling function, and a fast sweeping method. The fast sweeping method includes various alternating sweeps of the grid data using the forward modeling function. The seismic interpreter generates an attenuation model of the geological region of interest using the updated attenuated travel times.

In general, in one aspect, embodiments relate to a non-transitory computer readable medium storing instructions executable by a computer processor. The instructions obtain seismic data based on a seismic survey regarding a geological region of interest. The instructions further obtain grid data based on the geological region of interest. The grid data include various grid nodes disposed between a respective seismic source among various seismic sources and a respective seismic receiver among various seismic receivers. The seismic data correspond to a seismic survey based on the seismic sources and the seismic receivers. The instructions determine various travel times using the seismic data, the grid data, an Eikonal function, and a velocity model for the geological region of interest. The instructions further determine various attenuated travel times using the travel times, the grid data, and a forward modeling function that includes various gradient components. The instructions further determine various updated attenuated travel times using the attenuated travel times, the grid data, the forward modeling function, and a fast sweeping method. The fast sweeping method includes various alternating sweeps of the grid data using the forward modeling function. The instructions further generate an attenuation model of the geological region of interest using the updated attenuated travel times.

In some embodiments, a seismic image is generated for a geological region of interest based on an attenuation model and seismic data, wherein the attenuation model is used to compensate the seismic data for amplitude attenuation from one or more lithological interfaces within the geological region of interest. In some embodiments, a determination is made that a respective parallel processor among various parallel processors is assigned to perform a respective sweep among various alternating sweeps. One of the parallel processors may be disposed in a graphical processing unit (GPU). In some embodiments, the attenuation model is a Q model that describes various seismic quality factor values for the geological region of interest. In some embodiments, the grid data corresponds to a two-dimensional rectangular grid that includes a first corner, a second corner, a third corner, and a fourth corner. Alternating sweeps may include a first sweep, a second sweep, a third sweep, and a fourth sweep, where the first sweep determines first attenuated travel time data from the first corner to the fourth corner, and the second sweep determines second attenuated travel time data from the fourth corner to the first corner. In some embodiments, a determination is made whether various updated attenuated travel times satisfy a predetermined criterion, wherein the updated attenuated travel times are updated iteratively until the predetermined criterion is satisfied. In some embodiments, a predetermined criterion is a convergence criterion. In some embodiments, one or more frequency-dependent attenuation regions in the attenuation model are used to determine various interfaces within a geological region of interest. The interfaces are used to determine a presence of hydrocarbons in the geological region of interest. In some embodiments, seismic data regarding the geological region of interest is acquired using a seismic surveying system.

In light of the structure and functions described above, embodiments of the invention may include respective means adapted to carry out various steps and functions defined above in accordance with one or more aspects and any one of the embodiments of one or more aspect described herein.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for determining seismic attenuated travel time using a fast sweeping method (FSM). In some embodiments, attenuated travel time values are spread along a particular grid. After determining travel time values for various grid nodes by solving an Eikonal equation, local solutions of the attenuated travel time may be determined for the grid nodes by a finite difference approach. Rather than using a ray-based method, the solutions for the grid are iteratively updated using alternating sweeps (i.e., determining attenuated travel times at different starting locations in the grid). In some embodiments, the method uses parallel processing to determining solutions for different sweeps. Thus, the seismic data processing may be optimized as memory requirements may only depend on the size of the concerned grid region for a particular sweep.

Figure 1:
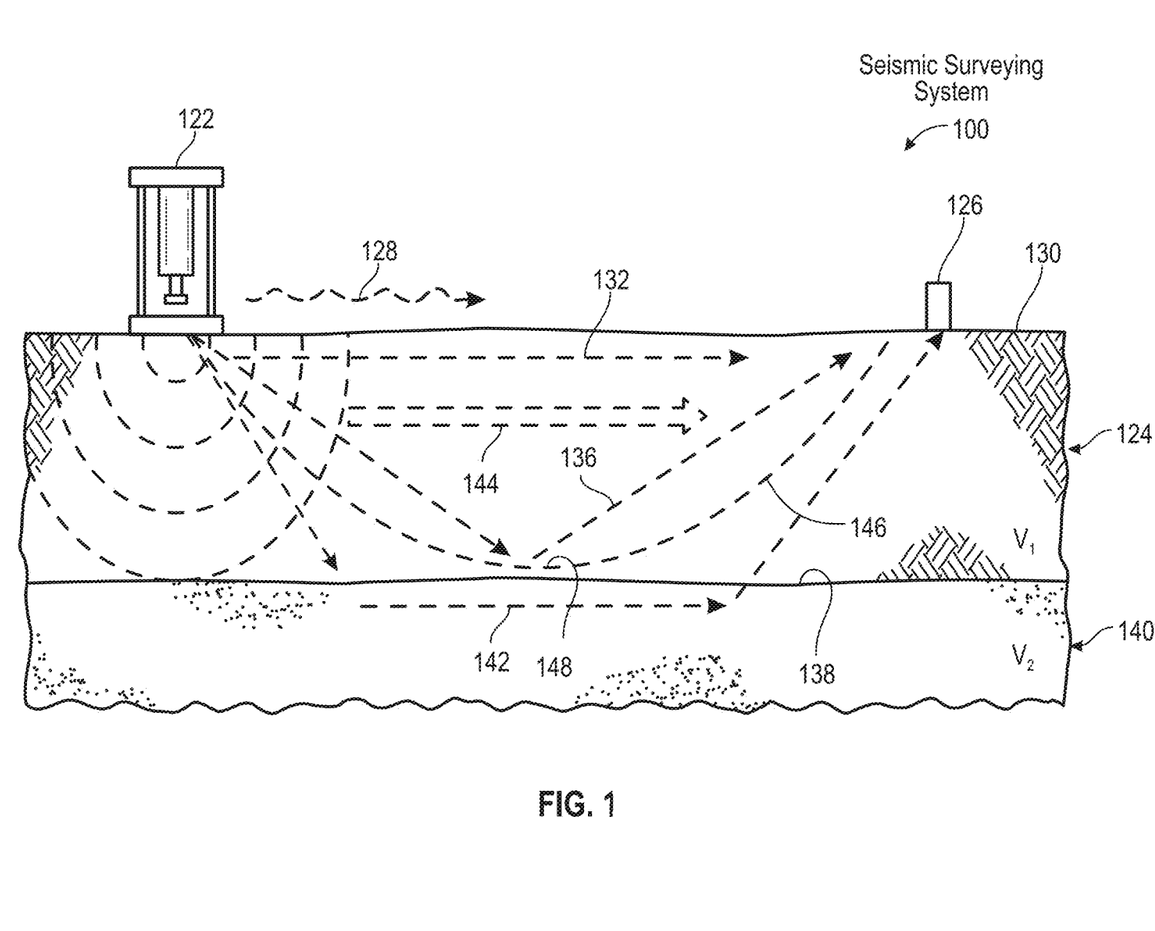
FIGS. 1 and 2 show systems in accordance with one or more embodiments.

Turning to FIG. 1, FIG. 1 shows a schematic diagram in accordance with one or more embodiments. As shown in FIG. 1, FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), refracting wave (142), or diving wave (146), through a subsurface layer (124). Pressure waves generated by the seismic source (122) may travel along several paths through a subsurface layer (124) at a velocity $V_1$ for detection at a number of seismic receivers (126) along the line of profile. Likewise, velocity may refer to multiple velocities types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a velocity $V_1$, while subsurface layer (140) has a velocity $V_2$. In words, different subsurface layers may correspond to different velocity values. In particular, a velocity may refer to the speed that a pressure wave travels through a medium, e.g., diving wave (146) that makes a curvilinear ray path (148) through subsurface layer (124). Velocity may depend on a particular medium's density and elasticity as well as various wave properties, such as the frequency of an emitted pressure wave. Where a velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the velocity $V_1$ through the subsurface layer (124) to the seismic receivers (126).

Turning to refracted pressure waves and diving pressure waves, the seismic source (122) may also generate a refracted wave (i.e., refracting wave (142)) that is refracted at the subsurface interface (138) and travels along the subsurface interface (138) for some distance as shown in FIG. 1 until traveling upwardly to the seismic receivers (126). As such, refracted pressure waves (e.g., refracted wave (142)) may be analyzed to map the subsurface layers (124, 140). For example, a refracted wave is a wave that a portion of ray path is along an interface of a reflector as show in refracting wave (142) in FIG. 1 (i.e., refraction exists only when $V_2 > V_1$). On the other hand, a diving wave may be generated where velocities are gradually increasing with depth at a gradient (e.g., diving wave (146)), such that the diving wave may turn back along curvilinear ray path. Likewise, the apex of a diving wave may be consistent with a reflected seismic wave in a common midpoint (CMP) gather.

Furthermore, in analyzing seismic data acquired using the seismic surveying system (100), seismic wave propagation may be approximated using rays. For example, reflected waves (e.g., reflected wave (136)) and diving waves (e.g., diving wave (146)) may be scattered at the subsurface interface (138). In FIG. 1, for example, the diving wave B (146) may exhibit a ray path of a wide angle that resembles a reflected wave in order to map the subsurface. Using diving waves, for example, a velocity model for an underlying subsurface may be generated that describes the velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a minimum that satisfies a predetermined criterion. For example, the optimization algorithm may be "linearized" and while achieving a "minimum", there may be no guarantee that it is a global minimum rather than a local minimum. Thus, it may be a simplification commonly adapted in solving inverse problems that works when a respective objective function is convex.

With respect to velocity models, a velocity model may map various subsurface layers based on velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types changes, such as interfaces between different subsurface layers. In some embodiments, a velocity model is updated using one or more tomographic updates to adjust the velocity boundaries in the velocity model.

Figure 2:
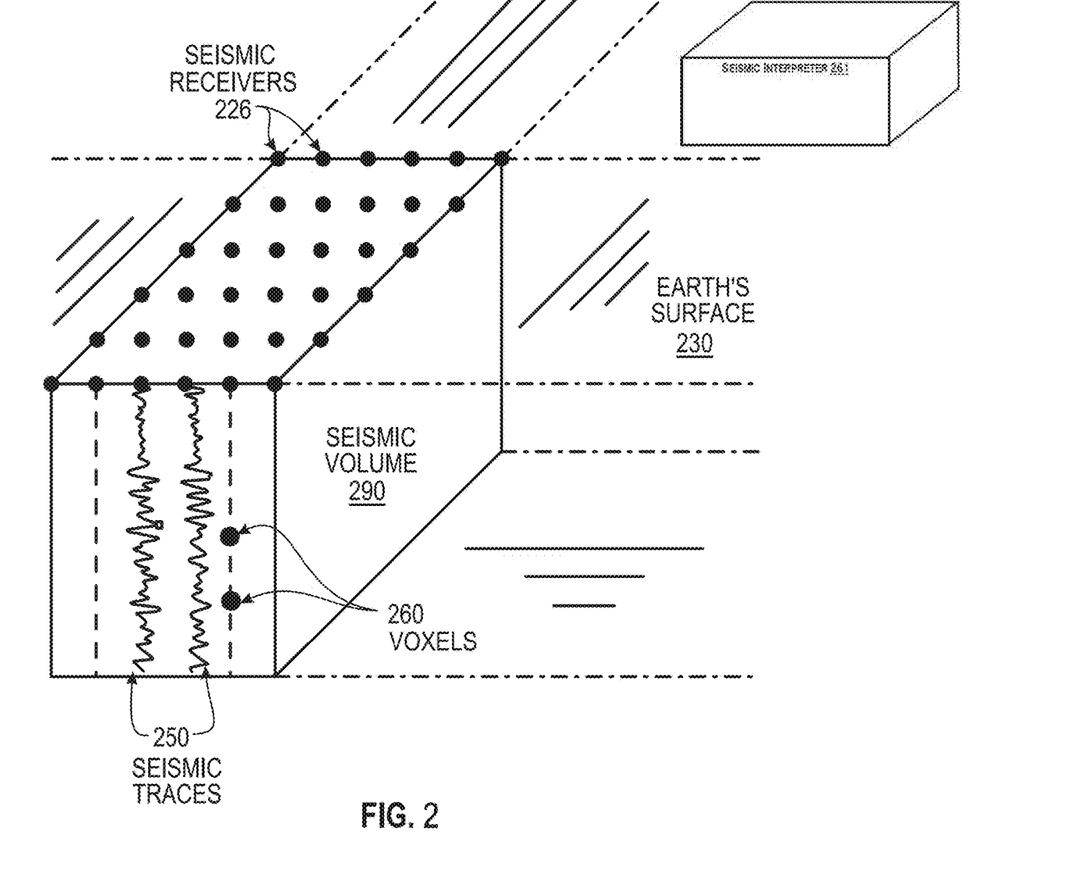

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a cubic dataset of seismic traces. In particular, seismic data may have up to four spatial dimensions, one temporal dimension (i.e., related to the actual measurements stored in the traces), and possibly another temporal dimension related to time-lapse seismic surveys. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave traveltimes and derive traveltime estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot−Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the down-going wave-field and the receiver wave-field the up-going wave-field.

In Kirchhoff and other migration methods, for example, the imaging condition may include a summation of contributions resulting from the input data traces after the traces have been spread along portions of various isochrones (e.g., using principles of constructive and destructive interference to form the image). For example, Kirchhoff migration function may be based on an integral form of a wave equation that corresponds to pressure wave displacement and a pressure wave velocity as function of three-dimensional space and time. As such, 3D prestack Kirchhoff depth migration may be characterized as the summation of various reflection amplitudes along diffraction traveltime curves to obtain the output seismic images. As such, Kirchhoff algorithms may preprocessing input seismic traces, determine traveltime tables for pressure waves using ray-tracing and a velocity model, and migrate these seismic traces. Besides Kirchhoff algorithms, other migration functions are also contemplated such as finite-difference migration, frequency-space migration, and frequency-wavenumber migration, and Stolt migration.

Furthermore, seismic data processing may include various seismic data functions that are performed using various process parameters and combinations of process parameter values. For example, a seismic interpreter may test different parameter values to obtain a desired result for further seismic processing. Depending on the seismic data processing algorithm, a result may be evaluated using different types of seismic data, such as directly on processed gathers, normal moveout corrected stacks of those gathers, or on migrated stacks using a migration function. Where structural information of the subsurface is being analyzed, migrated stacks of data may be used to evaluate seismic noise that may overlay various geological boundaries in the subsurface, such as surface multiples (e.g., strong secondary reflections that are detected by seismic receivers). As such, migrated images may be used to determine impact of noise removal processes, while the same noise removal processes may operate on gather data.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Additionally, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes various NMO gathers with amplitudes sampled from a common midpoint (CMP). In particular, a NMO correction may be a seismic imaging approximation based on calculating reflection traveltimes.

Moreover, pressure waves may undergo seismic attenuation when traveling within a medium, such as the earth's subsurface. For example, seismic attenuation may be an intrinsic property of rocks that relates to energy dissipation as pressure waves propagate through the subsurface. As such, attenuation may result in the decay of wave amplitudes in inelastic media. Several types of seismic attenuation may occur, such as (1) geometrical spreading (i.e., a wavefront radiating from a point source is distributed over a spherical surface of increasing size), (2) scattering or elastic attenuation, and (3) absorption or anelastic attenuation, Scattering may be caused by heterogeneity levels in the subsurface. In particular, scattering may be used to identify rocks containing oil and gas that result in energy attenuation among high frequency seismic waves. Thus, frequency-dependent attenuation, such as scattering, can be used to detect hydrocarbons.

With absorption or anelastic attenuation, energy loss may occur due to anelastic processes or internal friction during wave propagation. More specifically, anelastic attenuation may occur due to shear wave motions associated with lateral movements at interface boundaries, such as water, gas, formations, and grain boundaries. Mechanical energy losses from anelastic attenuation may be converted to heat energy which will eventually cause the total disappearance of the seismic wave. Beyond simple energy losses, anelastic attenuation may also cause a pressure wave to experience pulse broadening with increasing distances. As the wave spreads, anelastic attenuation may thereby remove high frequency components of the pressure wave. In modeling anelastic attenuation, seismic data processing may use an anelastic attenuation factor, often expressed as seismic quality factor Q. The seismic quality factor Q may be determined using Q tomography, where the seismic quality factor Q is inversely proportional to the anelastic attenuation factor. Thus, Q tomography may quantify the effects of anelastic attenuation on the seismic wavelet throughout the subsurface. Quantitative seismic attribute analysis of amplitude versus offset effects is complicated by anelastic attenuation because it is superimposed upon the AVO effects. In some embodiments, anelastic attenuation includes additional information about the lithology and reservoir conditions of a geological region, such as porosity, saturation and pore pressure levels. Thus, attenuation models may provide a useful reservoir characterization tool. Thus, an accurate seismic quality factor Q may be used to both compensate seismic data for the loss of information from attenuation and for seismic attribute analysis. Using Q tomography, for example, a seismic interpreter may generate various attenuation models from various geological regions. These attenuation models (also called Q models) may include three-dimensional frequency-independent regional models of the subsurface for either a p-wave (i.e., based on a seismic quality factor $Q_p$) or an s-wave (i.e., based on a seismic quality factor $Q_s$). In some embodiments, Q tomography uses a ray-based method based on pre-stack migrated common image gathers for estimating the quality factor Q. Likewise, various Q processing techniques may be implemented within other seismic data processes, such as Q full-waveform inversion or Q migration.

In seismic data processing, acquired seismic data R(f) may be determined in terms of a source wavelet S(f), a frequency independent factor G (which may include geometrical spreading, radiation patterns, and reflection coefficients, etc.), and a seismic attenuation effect H(f) in the frequency domain. In some embodiments, the acquired seismic data is expressed using the following equation:

$$R(f)=GH(f)S(f) \qquad \text{Equation (1)}$$

Seismic attenuation effect is accumulative along a ray path, and may be determined solely by the accumulation of seismic attenuated time $t^*$. In some embodiments, for example, the seismic attenuation effect H(f) is expressed using following Equation (2) and seismic attenuated time $t^*$ is expressed using following Equation (3), respectively:

$$H(f)=\exp(-f\!\int\!\pi/(Qv)dl)=\exp(-\pi f\!\int_l dt^*) \quad \text{Equation (2)}$$

$$t^*=\int_l 1/(Qv)dl \quad \text{Equation (3)}$$

where Q is a seismic quality factor, v is a seismic velocity, and f is a frequency component of the seismic wave. Attenuated time $t^*$ may integrate the effects of both seismic velocity v and the seismic quality factor Q along the ray path l in an absorptive medium.

Turning to the seismic interpreter (261), a seismic interpreter (261) (also called a "seismic processing system") may include hardware and/or software with functionality for storing the seismic volume (290), well logs, core sample data, and other data for seismic data processing, well data processing, and other data processes accordingly. In some embodiments, the seismic interpreter (261) may include a computer system that is similar to the computer (902) described below with regard to FIG. 9 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Throughout this application, "obtain" and similar terminology is used in the context of actively or passively accessing data, such as seismic data. By way of example, a seismic interpreter may "obtain" a particular type of data (e.g., seismic data, well data, geological data, etc.) by actively transmitting a request to a remote server or a local data store to retrieve the specific data. On the other hand, a computer system may "obtain" data as a passive recipient to the data, such as through a user uploading one or more data files to a local storage device coupled to the computer system that is "obtaining" the data. In contrast, "acquire" and similar terminology is used in the context of actively harvesting data from a physical environment through sensors, electronic receivers (such as seismic receivers), and/or other hardware sensing mechanisms.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
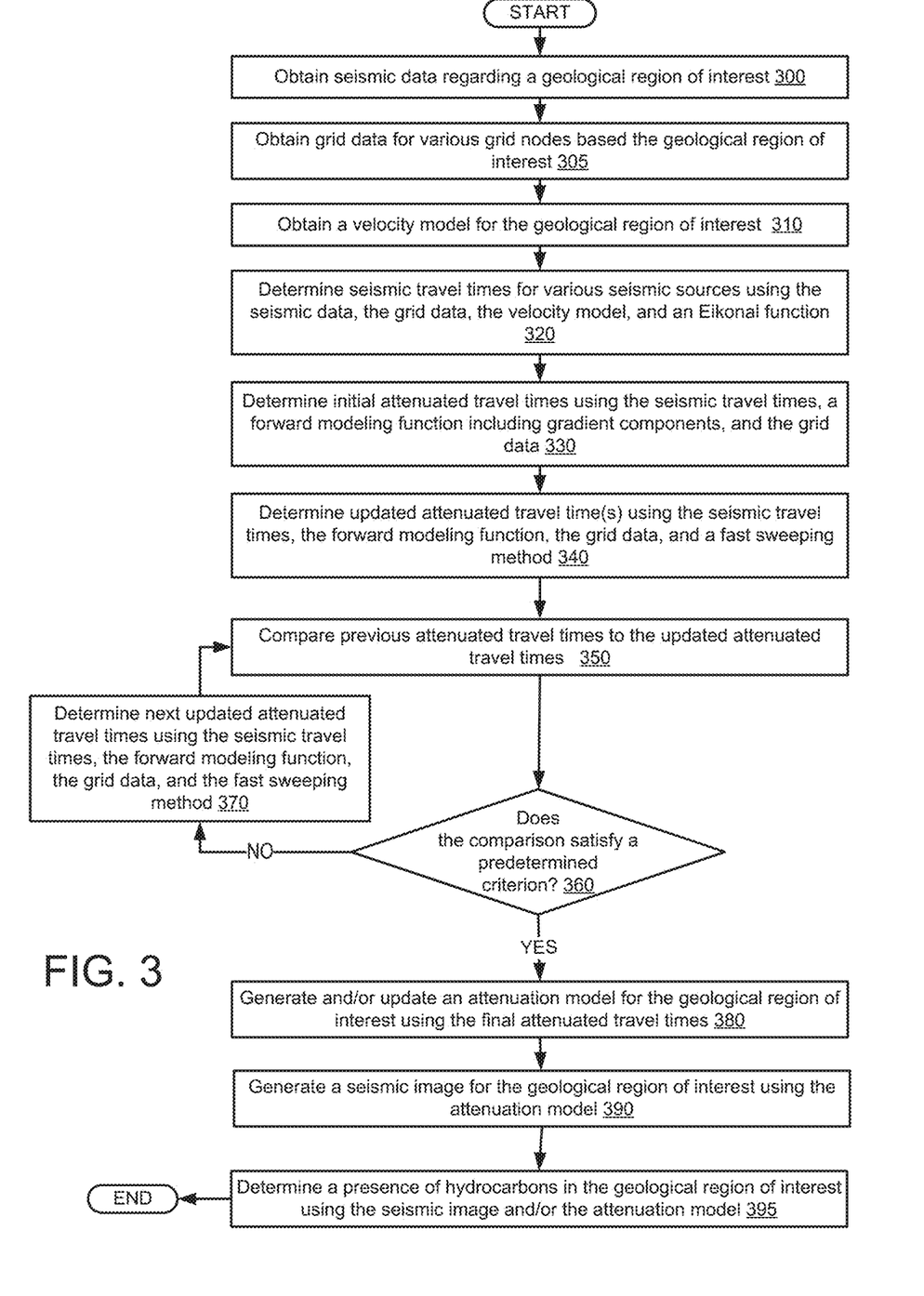
FIG. 3 shows a flowchart in accordance with one or more embodiments.

Turning to FIG. 3, FIG. 3 shows a flowchart in accordance with one or more embodiments. Specifically, FIG. 3 describes a general method for determining an attenuation model. One or more blocks in FIG. 3 may be performed by one or more components (e.g., seismic interpreter (261)) as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, seismic data are obtained regarding a geological region of interest in accordance with one or more embodiments. A geological region of interest may be a portion of a geological area or volume that includes one or more formations of interest desired or selected for analysis, e.g., for determining location of hydrocarbons or reservoir development purposes. The seismic data may be similar to the seismic data described above in FIGS. 1 and 2 and the accompanying description.

In Block 305, grid data are obtained for various grid nodes based on a geological region of interest in accordance with one or more embodiments. In particular, a geological region of interest may be described within a grid space with various grid nodes corresponding to different locations within the geological region. As such, a grid model may be two-dimensional or three-dimensional, where grid nodes provide discretized local solutions for determining seismic travel times or attenuated travel times during a data processing operation. The grid data may be obtained from a parameter file, where the parameter file includes grid node numbers, grid space dimensional information, and seismic source positions in the grid model. While the grid data may correspond to a regular grid, irregular grids are also contemplated with nonuniform grids, tree-based data structures, or triangulated meshes.

In Block 310, a velocity model is obtained for a geological region of interest in accordance with one or more embodiments. The velocity model may be similar to the velocity model described in FIGS. 1 and 2 and the accompanying description.

In Block 320, various seismic travel times are determined for various seismic sources using seismic data, grid data, a velocity model, and an Eikonal function in accordance with one or more embodiments. In some embodiments, seismic travel times of various grid nodes are determined by solving an Eikonal equation through a finite difference approach. For example, the Eikonal function may be based on the following Eikonal equation expressed below:

$$|\nabla t(x)| = \frac{1}{|v(x)|} \quad \text{Equation (4)}$$

where t is the travel time, v is seismic velocity, $\nabla$ is gradient operator, and x is a displacement vector of seismic source locations.

In Block 330, initial attenuated travel times are determined using seismic travel times, a forward modeling function including various gradient components, and grid data in accordance with one or more embodiments. In particular, a local solution of the attenuated travel time may be determined for various grid nodes using a forward modeling function. In some embodiments, for example, a forward modeling function corresponds to a forward propagation equation of attenuated travel time expressed below:

$$\nabla t^*(x) \cdot \nabla t(x) = \frac{q}{v^2} \quad \text{Equation (5)}$$

where $t^*$ is the attenuated travel time, $q=1/Q$ is inverse quality factor, v is seismic velocity. For example, the inverse quality factor may be proportional to the attenuation factor. A larger q means stronger attenuation. When performing the forward modeling function, a Q model or another attenuation model may be obtained prior to performing Block 330.

For a two-dimensional analysis of a geological region, Equation (5) may be reformulated below:

$$a\frac{\partial t^*}{\partial x} + b\frac{\partial t^*}{\partial z} = \frac{q}{v^2} \qquad \text{Equation (6)}$$

where $a=\partial t(x,z)/\partial x$ and $b=\partial t(x,z)/\partial z$ are the two gradient components of travel time $t$. Through mathematical operations, another forward modeling equation may be expressed as follows:

$$\frac{\partial}{\partial x}(at^*) + \frac{\partial}{\partial z}(bt^*) - t^*\left(\frac{\partial a}{\partial x} + \frac{\partial b}{\partial z}\right) = \frac{q}{v^2} \qquad \text{Equation (7)}$$

To solve Equation (7) by a finite difference approach, various gradient components a and b at grid points (i.e., where i,j=1,2,3, . . . ) may be determined using the following equations:

$$a_{i-\frac{1}{2},j} = \frac{t_{i,j} - t_{i-1,j}}{\Delta x}, \quad a_{i+\frac{1}{2},j} = \frac{t_{i+1,j} - t_{i,j}}{\Delta x} \qquad \text{Equation (8)}$$

$$b_{i,j-\frac{1}{2}} = \frac{t_{i,j} - t_{i,j-1}}{\Delta z}, \quad b_{i,j+\frac{1}{2}} = \frac{t_{i,j+1} - t_{i,j}}{\Delta z} \qquad \text{Equation (9)}$$

$$a^{\pm}_{i+\frac{1}{2},j} = \frac{a_{i+\frac{1}{2},j} \pm |a_{i+\frac{1}{2},j}|}{2} \quad a^{\pm}_{i-\frac{1}{2},j} = \frac{a_{i-\frac{1}{2},j} \pm |a_{i-\frac{1}{2},j}|}{2} \qquad \text{Equation (10)}$$

$$b^{\pm}_{i,j+\frac{1}{2}} = \frac{b_{i,j+\frac{1}{2}} \pm |b_{i,j+\frac{1}{2}}|}{2} \quad b^{\pm}_{i,j-\frac{1}{2}} = \frac{b_{i,j-\frac{1}{2}} \pm |b_{i,j-\frac{1}{2}}|}{2} \qquad \text{Equation (11)}$$

Accordingly, the finite difference solution of attenuated travel time may correspond to a local scheme expressed using the following equation:

$$\left(\frac{a^-_{i-\frac{1}{2},j} - a^+_{i+\frac{1}{2},j}}{\Delta x} + \frac{b^-_{i,j-\frac{1}{2}} - b^+_{i,j+\frac{1}{2}}}{\Delta z}\right)t^*_{i,j} = \qquad \text{Equation (12)}$$

$$\frac{a^-_{i-\frac{1}{2},j} t^*_{i-1,j} - a^+_{i+\frac{1}{2},j} t^*_{i+1,j}}{\Delta x} + \frac{b^-_{i,j-\frac{1}{2}} t^*_{i,j-1} - b^+_{i,j+\frac{1}{2}} t^*_{i,j+1}}{\Delta z} + \frac{q_{i,j}}{v^2_{i,j}}$$

As shown above in Equation (12), attenuated travel time $t_{i,j}^*$ may be expressed as a function of its neighboring values.

In Block 340, updated attenuated travel times are determined using seismic travel times, a forward modeling function, grid data, and a fast sweeping method in accordance with one or more embodiments. In some embodiments, a fast sweeping method advances wavefronts within a particular grid using iterative sweeping based on alternating sweeping orders. For example, the iterations may be Gauss-Seidel iterations that determine individual solutions at respective grid nodes during a particular sweep. In other words, an entire grid may be successively swept or traversed following a specific sweeping order (i.e., by alternating directions of sweeps with respect to a grid). Thus, a fast sweeping method may be performed until no grid values are further updated by a particular fast sweeping iteration, thus providing a global solution to the attenuated travel times. For each sweep, attenuated travel times may be determined for every grid cell in the grid data. In some embodiments, a fast sweeping method is stopped once a predetermined criterion (e.g., convergence) is determined for the attenuated travel times.

In some embodiments, the iterative process in a fast sweeping method proceeds as follows:

(a) n=1, initialize $t^{*(0)}$;

(b) $\tilde{t}^*_{i,j} = t^{*(n-1)}$;

(c) sweep from i=1:I, then from j=1:j, computation of $t^{*s}_{i,j}$, $\tilde{t}^*_{i,j}=\min(\tilde{t}^*_{i,j}, t^{*s}_{i,j})$;

(d) sweep from i=1:I, then from j=J:1, computation of $t^{*s}_{i,j}$, $\tilde{t}^*_{i,j}=\min(\tilde{t}^*_{i,j}, t^{*s}_{i,j})$;

(e) sweep from i=I:1, then from j=1:j, computation of $t^{*s}_{i,j}$, $\tilde{t}^*_{i,j}=\min(\tilde{t}^*_{i,j}, t^{*s}_{i,j})$;

(f) sweep from i=I:1, then from j=J:1, computation of $t^{*s}_{i,j}$, $\tilde{t}^*_{i,j}=\min(\tilde{t}^*_{i,j}, t^{*s}_{i,j})$;

(g) $t^{*(n)} = \tilde{t}^*_{i,j}$;

(h) if $t^{*(n)} = t^{*(n-1)}$, stop loop; otherwise n=n+1 and go to step (b).  Expressions (13)

As shown above, an upper index n of $t^{*(n)}$ may represent the iteration index of a fast sweeping method. First, initial values of $t^{*(0)}$ may be determined for a seismic source (e.g., in Block 330 above) and the iteration n is set to zero. Then, the attenuated travel time t $t^{(0)}$ at another place in the grid may be set to a value larger than the maximum expected attenuated travel time. At each iteration and for each grid node, a new $t^{*s}_{i,j}$ may be computed according to the Equation (12) above and the new $t^{*(n)}$ may be the minimum between $t^{*(n-1)}$ and $t^{*s}_{i,j}$. Above in Expressions (13), for example, the sweeping directions alternate in sweeps (c)-(f), where sweep C starts at the origin of a grid, i.e., i and j equal 1, while sweep (f) starts the far corner of the grid, i.e., i equals I and j equals J.

In Block 350, previous attenuated travel times are compared to updated attenuated travel times in accordance with one or more embodiments. As such, a seismic interpreter performing the process may compared previous attenuated travel times determined from a previous set of alternating sweeps to an updated attenuated travel times in the current set of alternating sweeps. For example, the difference in values may be analyzed for convergence or if the difference is close enough to terminate the iterative process.

In Block 360, a determination is made whether the comparison satisfies a predetermined criterion in accordance with one or more embodiments. In particular, the predetermined criterion may be a stopping criterion such a convergence criterion. Likewise, other criteria are contemplated, such as a specific number of fast sweeping method iterations. If it is determined that a predetermined criterion is satisfied, the process may proceed to Block 380. If it is determined that the predetermined criterion is not satisfied, then the process proceeds to Block 370, e.g., to perform a new set of alternating sweeps.

In Block 370, next updated attenuated travel times are determined using seismic travel times, a forward modeling function, grid data, and a fast sweeping method in accordance with one or more embodiments.

In some embodiments, updating attenuated travel times for different sweeps are performed by different GPUs (or other parallel processors) within a parallel-processing network.

In Block 380, an attenuation model is generated and/or updated for a geological region of interest using final attenuated travel times in accordance with one or more embodiments. In some embodiments, for example, the attenuation model is a Q model that descriptions different attenuation parameters within a geological region. As such, final attenuated travel time from an iterative process using a fast sweeping method may be used in subsurface imaging and geological characterization.

Figure 4:
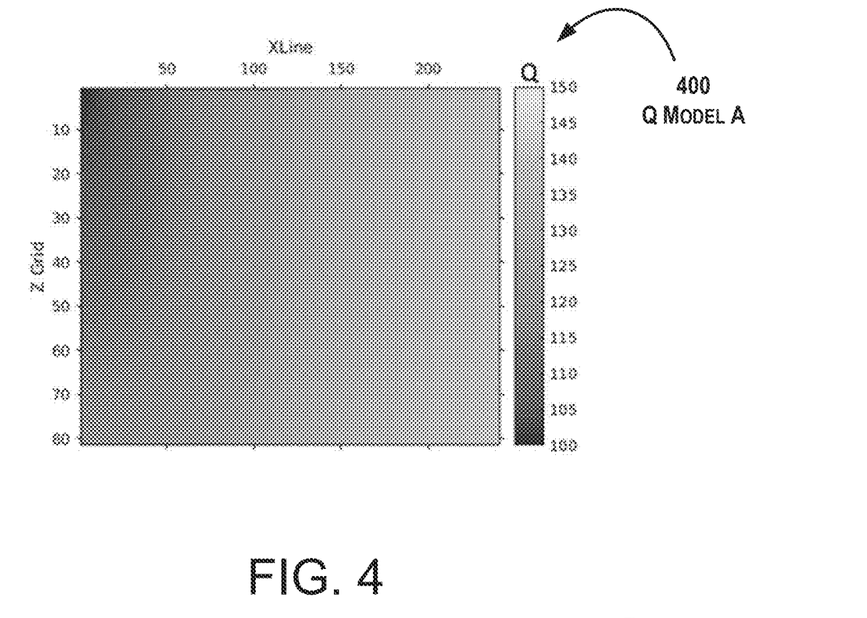
FIGS. 4, 5, 6, 7, and 8 show examples in accordance with one or more embodiments.
Figure 5:
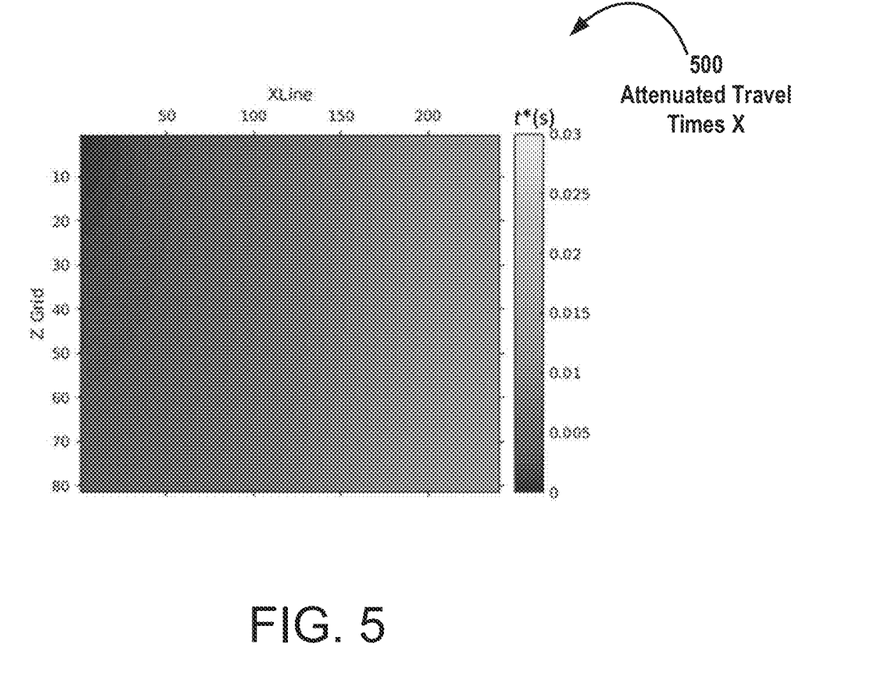
Figure 6:
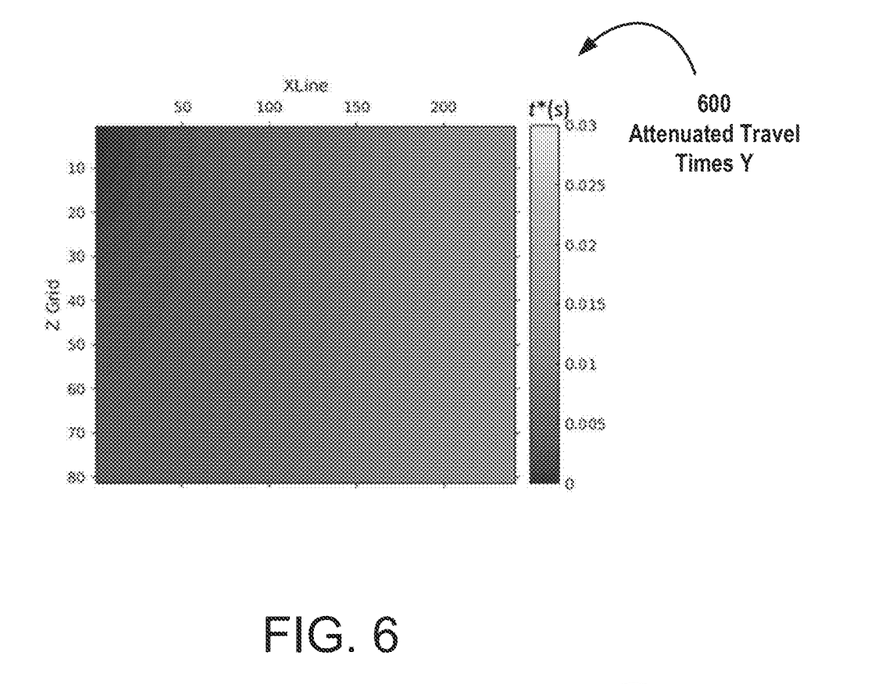
Figure 7:
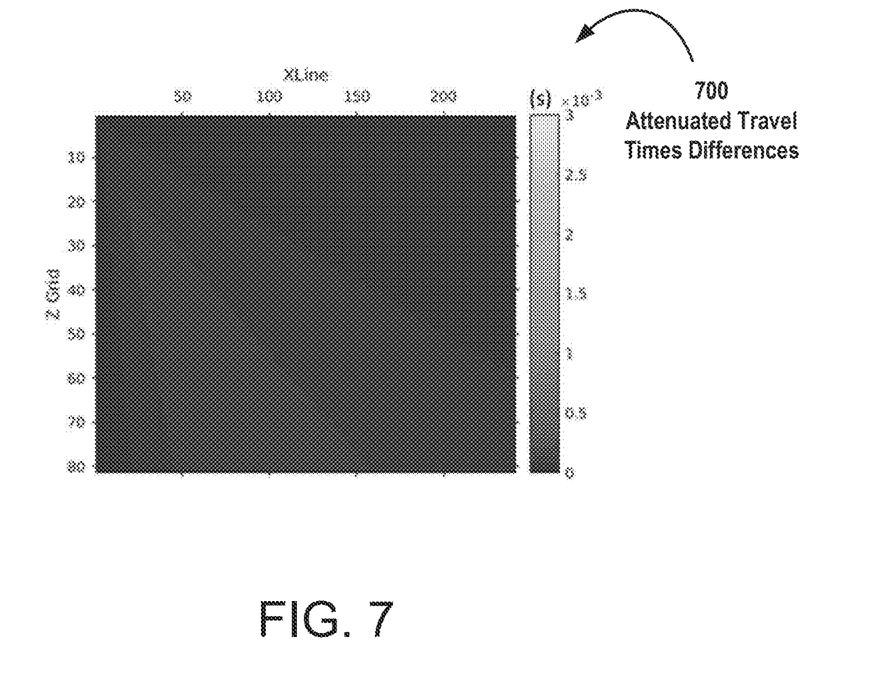

Turning to FIGS. 4, 5, 6, and 7, FIGS. 4, 5, 6, and 7 illustrate examples in accordance with one or more embodiments. In FIG. 4, a spatially varying Q model A (400) is shown where the seismic quality factor $$Q = 50 \times (3 - e^{-\frac{\sqrt{x^2 + z^2}}{2000}})$$

based on a constant velocity v=2000 m/s. In FIG. 5, attenuated travel times X (500) for the Q model A (400) are determined by a raypath integration (e.g., Equation 3 above). In FIG. 6, attenuated travel times Y (600) for Q model A (400) are determined using a forward modeling function and a fast sweeping method. In FIG. 7, attenuated travel time differences (700) are illustrated between attenuated travel times X (500) and attenuated travel times Y (600).

Returning to FIG. 3, in Block 390, a seismic image is generated for a geological region of interest using an attenuation model in accordance with one or more embodiments. For example, a set of migrated gathers may be summed or stacked to produce a final seismic image. In some embodiments, the seismic image provides a spatial and depth illustration of a subsurface formation for various practical applications, such as predicting hydrocarbon deposits, predicting wellbore paths for geosteering, etc. In some embodiments, the attenuation model is used to enhance the resolution of the seismic images. By compensating for amplitude attenuation with an attenuation model of the visco-elastic attenuation model type, seismic data may provide true relative-amplitude information for amplitude inversion, subsequent reservoir characterization, and correct timings for lithological identification.

In Block 395, a presence of one or more hydrocarbon deposits are determined in a geological region of interest using a seismic image and/or an attenuation model in accordance with one or more embodiments.

Figure 8:
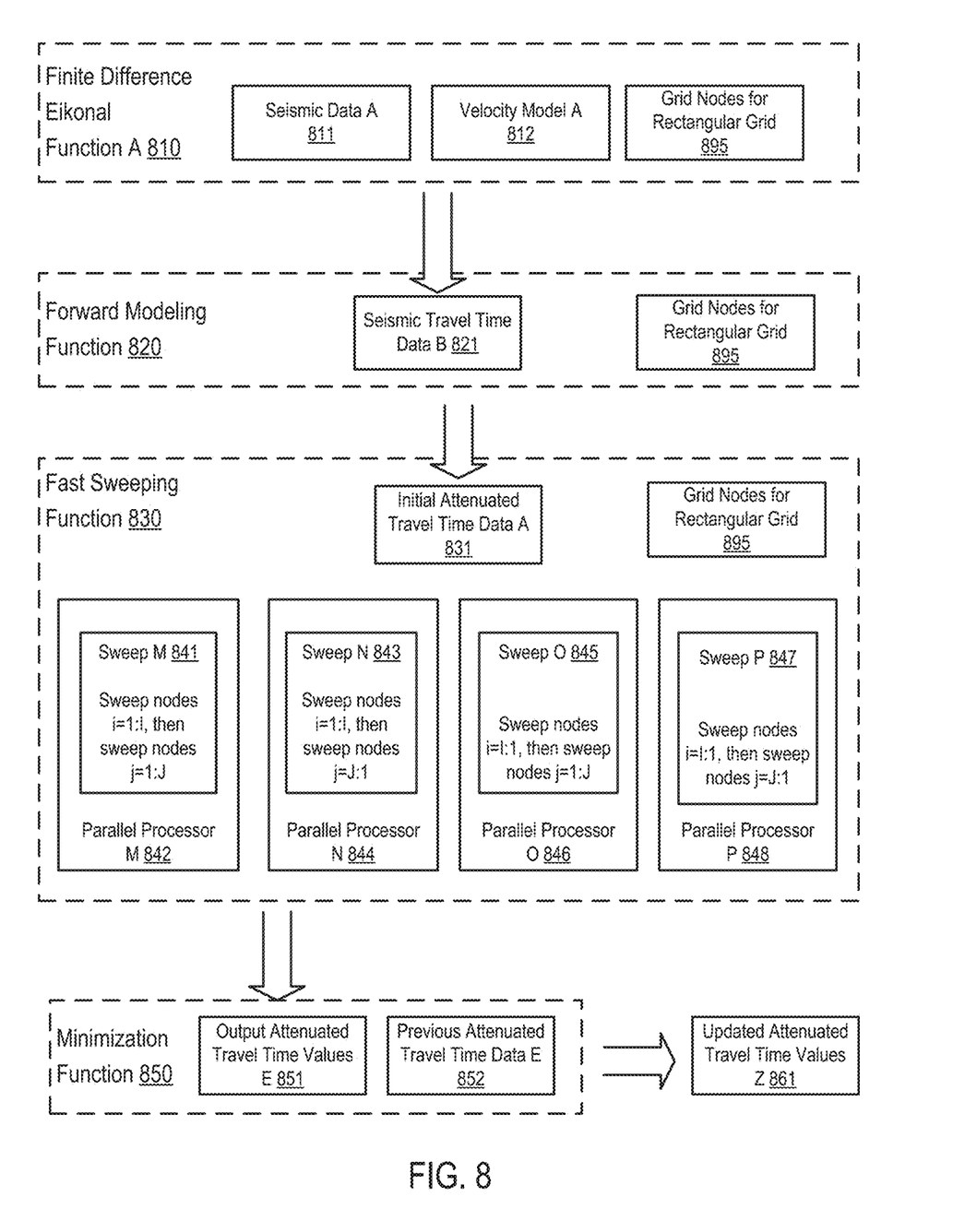

Turning to FIG. 8, FIG. 8 provides an example of determining attenuated travel time data using a fast sweeping method in accordance with one or more embodiments. The following example is for explanatory purposes only and not intended to limit the scope of the disclosed technology. In FIG. 8, a seismic interpreter (not shown) obtains seismic data A (811), a velocity model A (812), and grid nodes (895) for a rectangular grid. Using a finite difference Eikonal function (810), the seismic interpreter uses the input data (811, 812) and the grid nodes (895) to determine seismic travel time data B (821) for the grid nodes (895). Next, the seismic interpreter applies a forward modeling function (820) to the seismic travel time data B (821) with the grid nodes (895) to determine initial attenuated travel time data A (831). Afterwards, the seismic interpreter performs a fast sweeping function (830) with four sweeps, i.e., sweep M (841), sweep N (843), sweep O (845), and sweep P (847), that are performed by four different parallel processors, i.e., parallel process M (842), parallel processor N (844), parallel processor O (846), and parallel processor P (848), respectively.

Using the initial attenuated travel time data B (821) and the forward modeling function (820), the sweeps (841, 843, 845, 847) determine output attenuated travel time values E (851) for different sweeping directions. For example, sweep M (841) determines attenuated travel time values by sweep from nodes 1 to I along the i axis of grid nodes (895), and then nodes 1 to J along the j axis of grid nodes (895). The sweeping direction of the fast sweeping function (830) then alternates for sweep N (843), sweep O (845), and sweep P (847), respectively. A seismic interpreter subsequently compares the output attenuated travel time values E (851) from the sweeps (841, 843, 845, 847) with previous attenuated travel time data E (852) (i.e., the previous data may be the initial attenuated travel time data A (831) or the updated data from a previous iteration of an update algorithm). In particular, the seismic interpreter uses a minimization function (850) on the output attenuated travel time values E (851) and the previous attenuated travel time data E (852) to determine updated attenuated travel time values Z (861). After checking for convergence with the updated attenuated travel time values Z (861), the seismic interpreter may determine whether to proceed with another iteration or use the updated attenuated travel time values Z (861) to generate or update an attenuation model.

In some embodiments, computations for determining attenuation models may be performed on seismic data using various parallel processors to reduce computational runtime, e.g., in a GPU/CPU hybrid platform. By having a central processing unit (CPU) and graphical processing units (GPUs) (or other parallel processors) collaborate on a seismic data operation (e.g., Q full-waveform inversion or Q tomography), various computational bottlenecks may be prevented in the data processing. For example, a parallel processing network may generate an attenuation model using a fast sweeping method where alternating sweeps are performed by different parallel processors. In particular, the term "parallel processor" may refer to multiprocessors, individual processors, and computer processors that operate in parallel in a processing operation.

Computer System

Figure 9:
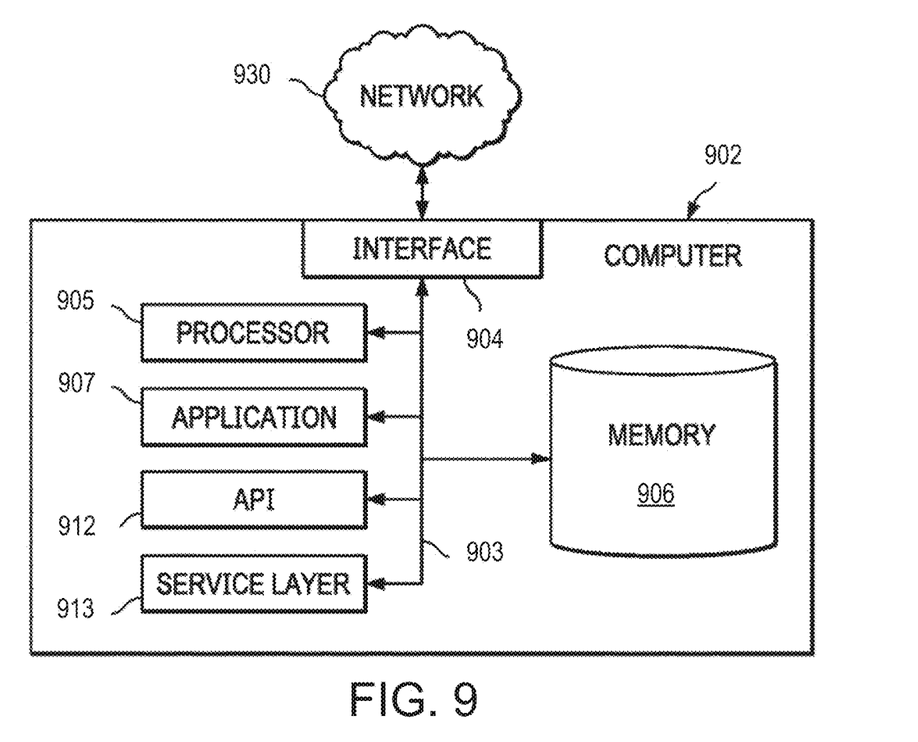
FIG. 9 shows a computing system in accordance with one or more embodiments.

Embodiments may be implemented on a computer system. FIG. 9 is a block diagram of a computer system used to provide computational functionalities associated with described algorithms, methods, functions, processes, flows, and procedures as described in the instant disclosure, according to an implementation. The illustrated computer (902) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930) or cloud. In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) or cloud from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or other suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930) or cloud. More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), each computer (902) communicating over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

In some embodiments, the computer (902) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   obtaining first seismic data based on a seismic survey regarding a geological region of interest;
   obtaining grid data based on the geological region of interest,
      wherein the grid data comprises a plurality of grid nodes disposed between a respective seismic source among a plurality of seismic sources and a respective seismic receiver among a plurality of seismic receivers, and
      wherein the first seismic data corresponds to a seismic survey based on the plurality of seismic sources and the plurality of seismic receivers;
   determining, by a computer processor, a plurality of travel times using the first seismic data, the grid data, an Eikonal function, and a velocity model for the geological region of interest;
   determining, by the computer processor, a plurality of attenuated travel times using the plurality of travel times, the grid data, and a forward modeling function comprising a plurality of gradient components;
   determining, by the computer processor, a plurality of updated attenuated travel times using the plurality of attenuated travel times, the grid data, the forward modeling function, and a fast sweeping method, wherein the fast sweeping method comprises a plurality of alternating sweeps of the grid data using the forward modeling function; and
   generating, by the computer processor, an attenuation model of the geological region of interest using the plurality of updated attenuated travel times.

2. The method of claim 1, further comprising:
   generating a seismic image for the geological region of interest based on the attenuation model and second seismic data,
   wherein the attenuation model is used to compensate the second seismic data for amplitude attenuation from one or more lithological interfaces within the geological region of interest.

3. The method of claim 1, further comprising:
   determining that a respective parallel processor among a plurality of parallel processors is assigned to perform a respective sweep among the plurality of alternating sweeps,
   wherein at least one of the plurality of parallel processors is disposed in a graphical processing unit (GPU).

4. The method of claim 1,
   wherein the attenuation model is a Q model that describes a plurality of seismic quality factor values for the geological region of interest.

5. The method of claim 1,
   wherein the grid data corresponds to a two-dimensional rectangular grid comprising a first corner, a second corner, a third corner, and a fourth corner,
   wherein the plurality of alternating sweeps comprises a first sweep, a second sweep, a third sweep, and a fourth sweep,
   wherein the first sweep determines first attenuated travel time data from the first corner to the fourth corner, and
   wherein the second sweep determines second attenuated travel time data from the fourth corner to the first corner.

6. The method of claim 1, further comprising:
   determining whether the plurality of updated attenuated travel times satisfy a predetermined criterion,
   wherein the plurality of updated attenuated travel times are updated iteratively until the predetermined criterion is satisfied.

7. The method of claim 6,
   wherein the predetermined criterion is a convergence criterion.

8. The method of claim 1, further comprising:
   determining, using one or more frequency-dependent attenuation regions in the attenuation model, a plurality of interfaces within the geological region of interest; and
   determining, using the plurality of interfaces, a presence of hydrocarbons in the geological region of interest.

9. The method of claim 1, further comprising:
   acquiring, using a seismic surveying system, the first seismic data regarding the geological region of interest.

10. A system, comprising:
    a network comprising a plurality of parallel processors; and
    a seismic interpreter comprising a computer processor, wherein the seismic interpreter is coupled to the network, the seismic interpreter comprising functionality for:
       obtaining first seismic data based on a seismic survey regarding a geological region of interest;
       obtaining grid data based on the geological region of interest,
          wherein the grid data comprises a plurality of grid nodes disposed between a respective seismic source among a plurality of seismic sources and a respective seismic receiver among a plurality of seismic receivers, and
          wherein the first seismic data corresponds to a seismic survey based on the plurality of seismic sources and the plurality of seismic receivers;
       determining a plurality of travel times using the first seismic data, the grid data, an Eikonal function, and a velocity model for the geological region of interest;
       determining a plurality of attenuated travel times using the plurality of travel times, the grid data, and a forward modeling function comprising a plurality of gradient components;
       determining, using the plurality of parallel processors, a plurality of updated attenuated travel times using the plurality of attenuated travel times, the grid data, the forward modeling function, and a fast sweeping method, wherein the fast sweeping method comprises a plurality of alternating sweeps of the grid data using the forward modeling function; and generating an attenuation model of the geological region of interest using the plurality of updated attenuated travel times.

11. The system of claim 10,
wherein a respective parallel processor among a plurality of parallel processors is assigned to perform a respective sweep among the plurality of alternating sweeps, and
wherein at least one of the plurality of parallel processors is disposed in a graphical processing unit (GPU).

12. The system of claim 10, wherein the seismic interpreter further comprises functionality for:
generating a seismic image for the geological region of interest based on the attenuation model and second seismic data,
wherein the attenuation model is used to compensate the second seismic data for amplitude attenuation from one or more lithological interfaces within the geological region of interest.

13. The system of claim 10,
wherein the attenuation model is a Q model that describes a plurality of seismic quality factor values for the geological region of interest.

14. The system of claim 10,
wherein the grid data corresponds to a two-dimensional rectangular grid comprising a first corner, a second corner, a third corner, and a fourth corner,
wherein the plurality of alternating sweeps comprises a first sweep, a second sweep, a third sweep, and a fourth sweep,
wherein the first sweep determines first attenuated travel time data from the first corner to the fourth corner, and
wherein the second sweep determines second attenuated travel time data from the fourth corner to the first corner.

15. The system of claim 10, wherein the seismic interpreter further comprises functionality for:
determining whether the plurality of updated attenuated travel times satisfy a predetermined criterion,
wherein the plurality of updated attenuated travel times are updated iteratively until the predetermined criterion is satisfied, and
wherein the predetermined criterion is a convergence criterion.

16. The system of claim 10, wherein the seismic interpreter further comprises functionality for:
determining, using one or more frequency-dependent attenuation regions in the attenuation model, a plurality of interfaces within the geological region of interest; and
determining, using the plurality of interfaces, a presence of hydrocarbons in the geological region of interest.

17. The system of claim 10, further comprising:
a seismic surveying system, wherein the seismic surveying system comprises at least one seismic source and a plurality of seismic receivers,
wherein the seismic surveying system acquires the first seismic data.

18. A non-transitory computer readable medium storing instructions executable by a computer processor, the instructions comprising functionality for:
obtaining first seismic data based on a seismic survey regarding a geological region of interest;
obtaining grid data based on the geological region of interest,
wherein the grid data comprises a plurality of grid nodes disposed between a respective seismic source among a plurality of seismic sources and a respective seismic receiver among a plurality of seismic receivers, and
wherein the first seismic data corresponds to a seismic survey based on the plurality of seismic sources and the plurality of seismic receivers;
determining a plurality of travel times using the first seismic data, the grid data, an Eikonal function, and a velocity model for the geological region of interest;
determining a plurality of attenuated travel times using the plurality of travel times, the grid data, and a forward modeling function comprising a plurality of gradient components;
determining a plurality of updated attenuated travel times using the plurality of attenuated travel times, the grid data, the forward modeling function, and a fast sweeping method, wherein the fast sweeping method comprises a plurality of alternating sweeps of the grid data using the forward modeling function; and
generating an attenuation model of the geological region of interest using the plurality of updated attenuated travel times.

19. The non-transitory computer readable medium of claim 18, wherein the instructions further comprise functionality for:
generating a seismic image for the geological region of interest based on the attenuation model and second seismic data,
wherein the attenuation model is used to compensate the second seismic data for amplitude attenuation from one or more lithological interfaces within the geological region of interest.

20. The non-transitory computer readable medium of claim 18,
wherein the grid data corresponds to a two-dimensional rectangular grid comprising a first corner, a second corner, a third corner, and a fourth corner,
wherein the plurality of alternating sweeps comprises a first sweep, a second sweep, a third sweep, and a fourth sweep,
wherein the first sweep determines first attenuated travel time data from the first corner to the fourth corner, and
wherein the second sweep determines second attenuated travel time data from the fourth corner to the first corner.

* * * * *